(12) United States Patent
Charpentier et al.

(10) Patent No.: US 9,109,076 B2
(45) Date of Patent: Aug. 18, 2015

(54) SELF-CLEANING COATINGS

(75) Inventors: Paul A. Charpentier, London (CA); Kevin D. Burgess, Toronto (CA)

(73) Assignee: THE UNIVERSITY OF WESTERN ONTARIO, London, ON (CA)

(*) Notice: Subject to any disclaimer, the term of this patent is extended or adjusted under 35 U.S.C. 154(b) by 60 days.

(21) Appl. No.: 13/143,781

(22) PCT Filed: Jan. 8, 2010

(86) PCT No.: PCT/CA2010/000009
§ 371 (c)(1),
(2), (4) Date: Sep. 26, 2011

(87) PCT Pub. No.: WO2010/078649
PCT Pub. Date: Jul. 15, 2010

(65) Prior Publication Data
US 2012/0010314 A1    Jan. 12, 2012

Related U.S. Application Data

(60) Provisional application No. 61/193,918, filed on Jan. 8, 2009.

(51) Int. Cl.
| | |
|---|---|
| *C08G 18/48* | (2006.01) |
| *C08G 18/32* | (2006.01) |
| *C08G 18/34* | (2006.01) |
| *C08G 18/38* | (2006.01) |
| *C08G 18/76* | (2006.01) |
| *C08G 18/10* | (2006.01) |
| *C08G 18/82* | (2006.01) |
| *C08G 18/83* | (2006.01) |
| *C08G 18/08* | (2006.01) |
| *C09D 7/12* | (2006.01) |
| *C09D 175/04* | (2006.01) |
| *C09D 175/08* | (2006.01) |
| *C08L 75/04* | (2006.01) |
| *C08L 75/08* | (2006.01) |
| *C08K 3/22* | (2006.01) |
| *C08K 9/02* | (2006.01) |

(52) U.S. Cl.
CPC ........ *C08G 18/4854* (2013.01); *C08G 18/0823* (2013.01); *C08G 18/10* (2013.01); *C08G 18/348* (2013.01); *C08G 18/3897* (2013.01); *C08G 18/7671* (2013.01); *C08G 18/82* (2013.01); *C08G 18/838* (2013.01); *C08L 75/04* (2013.01); *C08L 75/08* (2013.01); *C09D 7/1225* (2013.01); *C09D 7/1266* (2013.01); *C09D 7/1275* (2013.01); *C09D 175/04* (2013.01); *C09D 175/08* (2013.01); *C08K 3/22* (2013.01); *C08K 9/02* (2013.01); *C08K 2003/2241* (2013.01)

(58) Field of Classification Search
USPC ......... 521/170; 528/65, 76, 85; 977/773, 775, 977/779, 811, 823, 834, 836
IPC ............ C08G 18/4854,18/0823, 18/10, 18/348, C08G 18/3897, 18/7671, 18/838, 18/82; C08K 2003/2241
See application file for complete search history.

(56) References Cited

U.S. PATENT DOCUMENTS 6,667,360 B1 * 12/2003 Ng et al. ....................... 524/492

OTHER PUBLICATIONS

Kasaned et al., "Self-Cleaning, titanium dioxide based, multilayer coating fabricated on polymer and glass surfaces", J. Applied Polymer Sc., vol. 111, Nov. 25, 2001, pp. 2597-2606.
Machida et al., Preparation of colourless polyurethane/titania hybrid material, Polymer Preprints, Japan, vol. 55, No. 1, 2006, p. 900.
Chen et al., Synthesis, characterisation and infrared emissivity study of polyurethane/TiO2 nanocomposites, Applied Surface Sc., 253, 2007, pp. 9154-9158.
Parkin et al., Self cleaning coating, J. Mater. Chem, vol. 15, 2005, pp. 1689-1695.
Shah, et al., Silver on PEF-PU=TiO2 polymer nanocomposite films: An excellent system for antibacterial applications, Chem. Mater. vol. 20, 2008, pp. 2455-2460.
International Search Report for PCT/CA2010/000009, application published Jul. 5, 2010.
Machida et al., Preparation of colourless polyurethane/titania hybrid materials, Polymer Preprints, Japan, vol. 55, No. 2, 2006, pp. 3620.
Chen et al, Microstructure and properties of polyester-based polyurethane/titania hybrid films prepared by sol-gel process., Polymer, vol. 47, 2006, pp. 1640-1648.
Chen et al.: "Roles of anatase and rutile TiO2 nanoparticles in photooxidation of polyurethane", Polymer Testing, Elsevier, Amsterdam, NL, vol. 26, No. 2, Feb. 9, 2007, pp. 202-208, XP005878317.
Zhou H. et al.: "Water Vapor Permeability of Polyurethane/TiO2 Nanohybrid Membrane with Temperature Sensitivity", J. Appl. Polym. Sci., vol. 109, 2008, pp. 3002-3007, XP002696847.

(Continued)

*Primary Examiner* — Rabon Sergent
(74) *Attorney, Agent, or Firm* — Lynn C. Schumacher; Hill & Schumacher

(57) ABSTRACT

The present invention provides two methods for synthesizing novel titania-polyurethane (nTiO$_2$-PU) nanocomposites for self-cleaning coatings, one a polymer functionalization method ("grafting to") and the other, a monomer functionalization method ("grafting from"). Here, 2,2 bis(hydroxymethyl) propionic acid (HMPA) was used as the coordination agent, which was reacted with n-TiO$_2$ (50:50 anatase/rutile) to form nTiO$_2$-HMPA, then polymerized in the monomer functionalization method. In the polymer functionalization method, HMPA was reacted with a pre-polymer to form the PU, and then subsequently reacted with n-TiO$_2$ to form the polymer nanocomposite. The photocatalytic cleanability of the nanocomposites was investigated when exposed to ultraviolet radiation using additional unreacted HMPA or stearic acid as the model "dirt" compounds. Nanocomposites prepared using both strategies showed similar self-cleaning behavior, although the monomer technique gave less substrate degradation.

19 Claims, 7 Drawing Sheets

(56) References Cited

OTHER PUBLICATIONS

Database Compendex [Online] Engineering Information, Inc., New York, NY, US; Jan. 2005, Liu F-C et al.: "Research of photocatalystic activity of nano-TiO2/Polyurethane composite coating", XP002696848, Database accession No. E2005118999935 (abstract) & Gongneng Cailiao/ Journal of Functional Materials Jan. 2005, Journal of Functional Materials CN, vol. 36, No. 1, Jan. 2005, pp. 129-132.

Database Compendex [Online] Engineering Information, Inc., New York, NY, US; 2005, Uddin M F et al.: "Anisotropic behavior of rigid polyurethane foam with acicular nanoparticles infusion under high strain rate compression", XP002696868, Database accession No. E20125115813216 (abstract) & 20th Technical Conference of the American Society for Composites 2005, Destech Publications USA, vol. 2, 2005, pp. 775-789.

Database Compendex [Online] Engineering Information, Inc., New York, NY, US; 2007, Saha M C et al.: "Experimental investigation on mode-I fracture toughness of polyurethane foams with nanoparticles", XP002696869, Database accession No. E20124415614446 (abstract) & 22nd Technical Conference for the American Society for Composites 2007—"Composites: Enabling a New Era in Civil Aviation", vol. 3, 2007, pp. 1850-1865.

* cited by examiner

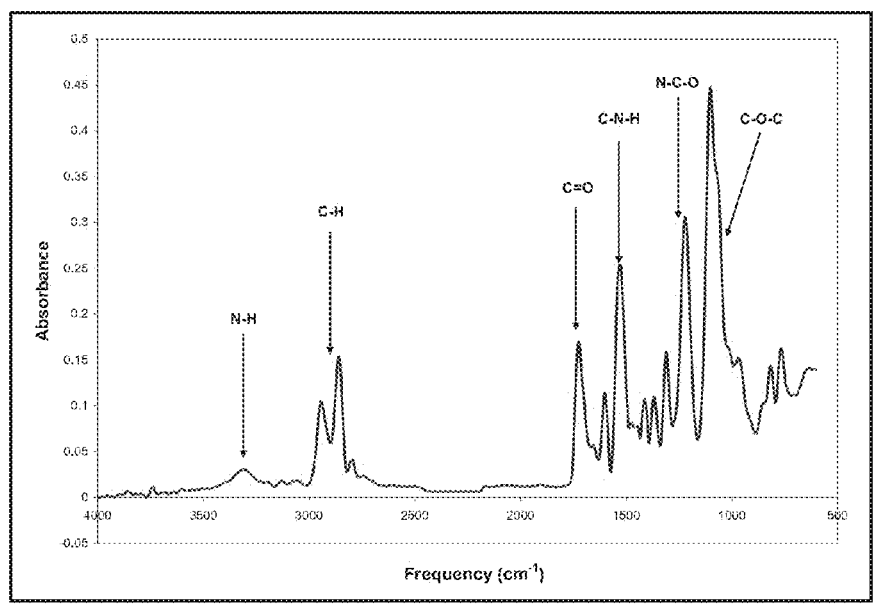
FIGURE 2
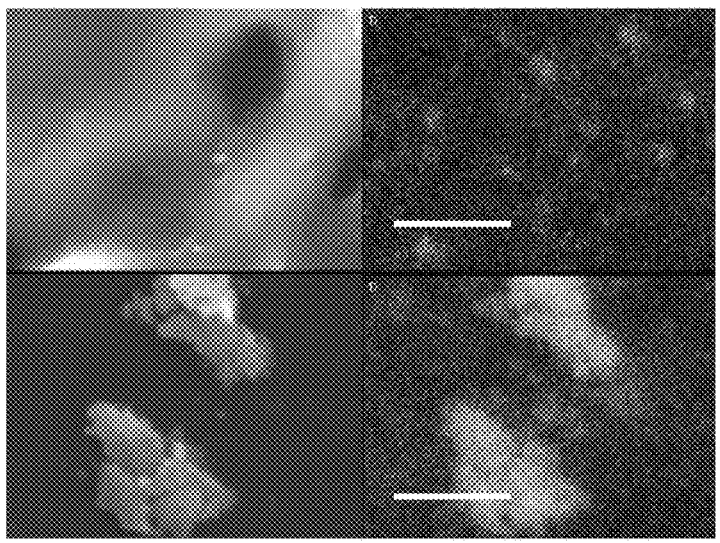
FIGURE 3(a)
FIGURE 3(b)

Scheme 1

Scheme 2

US 9,109,076 B2

SELF-CLEANING COATINGS

CROSS REFERENCE TO RELATED U.S. APPLICATIONS

This patent application application is a National Phase application claiming the benefit of PCT/CA2010/000009 filed on Jan. 8, 2010, in English; which further claims the priority benefit of U.S. provisional patent application Ser. No. 61/193,918 filed on Jan. 8, 2009, both of which are incorporated herein by reference in their entirety.

FIELD OF THE INVENTION

The present invention relates to self-cleaning coatings produced from nanotitania-polyurethane ($nTiO_2$-PU) nanocomposites.

BACKGROUND TO THE INVENTION

Self-cleaning surfaces using nanostructured titania ($nTiO_2$) have been of significant recent academic and industrial interest, showing potential on glass surfaces providing antibacterial properties [1-3]. Research into $TiO_2$ as a photocatalyst semiconductor originally began in the early 1970's with the pioneering work of Honda and Fujishima who investigated the splitting of water into oxygen and hydrogen using $TiO_2$ irradiated by UV light [4]. Currently, $TiO_2$ photocatalysis is actively used in the field of photodegradation of organic compounds, specifically in environmental decontamination of air [5] and water [6]. Although most photocatalytic self-cleaning coating research has focused on self-cleaning glass, [7] self-cleaning polymers for paints and coatings are of significant potential industrial and scientific importance. However, little work has been performed on the chemistry for the integration of nano titania ($nTiO_2$) into polymers for self-cleaning coatings. As dirt and bacteria accumulate on almost every surface, nanocomposites that both strengthen the polymer, while providing self-cleaning behavior would be of significant interest.

Inorganic/organic hybrids are emerging materials for polymer coatings due to their extraordinary and unique combination of properties originating from the synergism between the inorganic nanoparticles and the polymer. Addition of a relatively small amount of the nanoparticles (e.g., less than 10 wt. %) dramatically changes the properties of the resulting polymer nanocomposite. As examples, $nTiO_2$ was used as a radio-pacifier in dental composites and bone cements, [8, 9] as a solid plasticizer of polyethylene oxide (PEO) for lithium batteries, [10, 11] as a dye in a conjugated polymer for photoelectrochemical [12] or photoconductive [13] agents, and as a photocatalyst in a photodegradable $TiO_2$-polystyrene nanocomposite films [14].

Due to their extremely large surface-area/particle-size ratio, nanoparticles have a thermodynamic tendency to aggregate into clusters, reducing the resultant properties of the nanocomposite materials [15]. Many efforts have been taken in order to increase the nanoparticle dispersion and to enhance the filler-matrix interaction [16]. Increasing the dispersion of $TiO_2$ nanoparticles into a PVC polymer matrix was shown to increase the photocatalytic degradation significantly [17, 18]. One approach is breaking down the agglomerated nanoparticles using a mechanical method such as ultrasonic irradiation, which has been explored for dispersion of $SiO_2$, $TiO_2$, and $Al_2O_3$ nanoparticles during the synthesis of inorganic/polymer nanocomposite materials [19-21]. However, this approach is restricted due to the limited interaction between the inorganic fillers and the organic matrix, compared with the very strong interaction between individual nanoparticles.

An improved approach, termed "grafting to" or the polymer approach is modifying the surface of the inorganic filler with covalent attachment of the polymer chains minimizing agglomeration, while strengthening the interaction between the nanofiller and the polymer matrix. In a separate approach, the "grafting from" or monomer approach, polymer chains are grown from a nanosurface providing potentially higher graft densities and better control of the molecular weight and polydispersity of the polymer chains [22-25].

It would therefore be advantageous to provide self-cleaning coatings which avoid the above-mentioned limitations.

SUMMARY OF THE INVENTION

Embodiments of the present invention provide a self-cleaning composition for application to surfaces, comprising titania-polymer ($nTiO_2$—P) nanocomposites, wherein said polymer is a step-growth polymer containing an HO—R (COOH)—OH type functionality.

In an embodiment of the present invention there is provided a self-cleaning composition for application to surfaces, comprising titania-polyurethane ($nTiO_2$-PU) nanocomposites.

The $nTiO_2$ includes titanium (IV) oxide nanoparticles ($nTiO_2$) and may have a composition with anatase:rutile ratios in a range from about 10:90 to about 90:10.

A preferred composition may have a composition which is about 50:50 anatase:rutile.

The nanoparticles may have an average particle size of in a range from about 1 nm to about 500 nm.

The $nTiO_2$ may be doped with one of transition metals, anions, zinc oxide, and any combination thereof. The transition metals may be any one or combination of Fe, Cr, V, N, Co, and the anions may be any one or combination of nitrogen, sulphur and fluorine anions.

The composition according to claim 1 produced by a method comprising the steps of:

a) reacting 4,4-methylene bis(p-pheyl isocyanate) with poly(tetrahydrofuran) to form a prepolymer, polymerizing the prepolymer in the presence of a chain extender 2,2-bis (hydroxymethyl)propionic acid to form polyurethane; and b) reacting the polyurethane with $TiO_2$ nanoparticles at a desired wt. % to produce the titania-polyurethane ($nTiO_2$-PU) nanocomposites, following the scheme as follows:

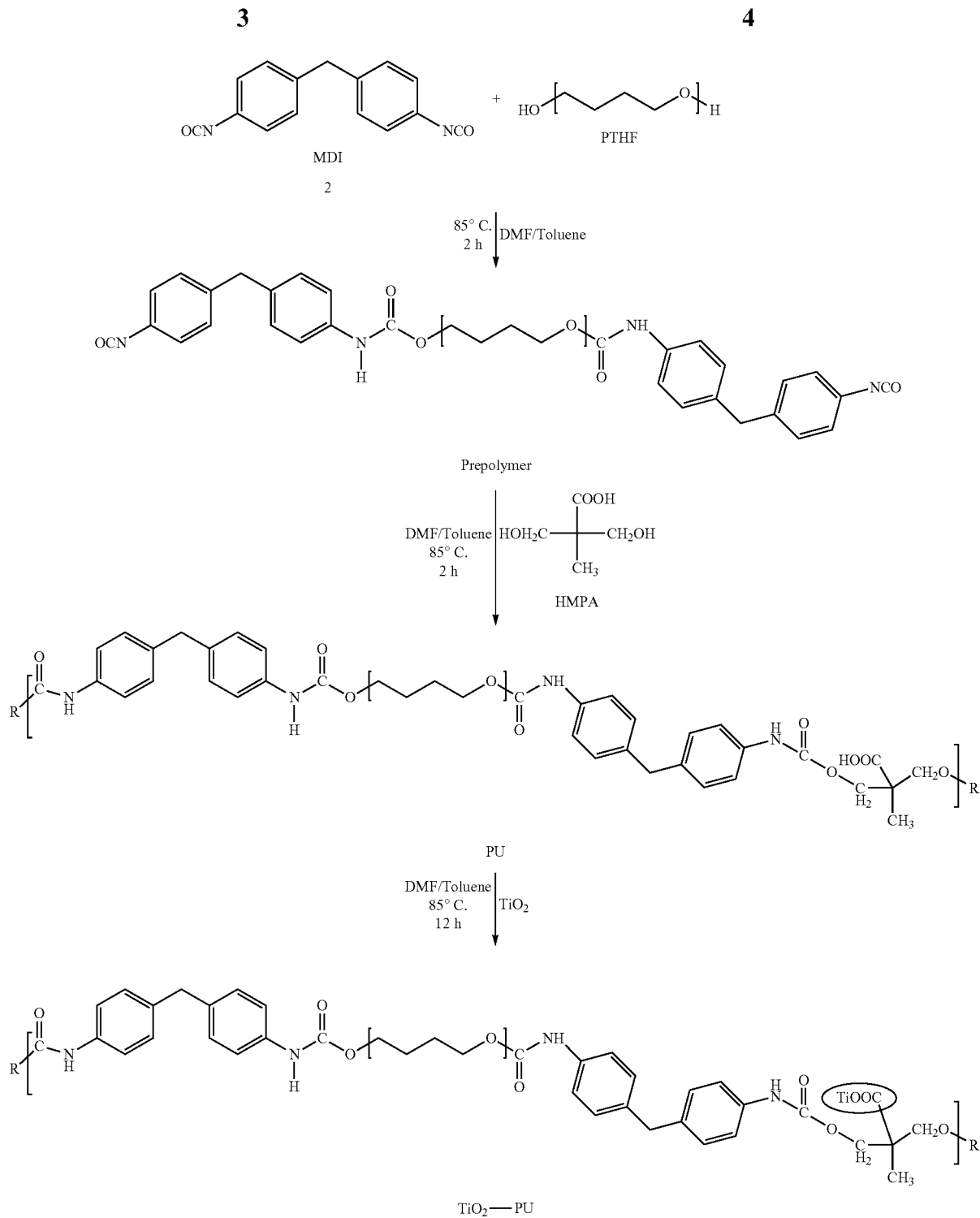

The location of the linkage of the titania nanoparticle to the polymer backbone is shown circled.

In an alternative embodiment the composition may be produced by a method comprising the steps of:
 a) reacting nTiO$_2$ with 2,2-bis(hydroxymethyl)propionic acid (HMPA) to produce a functionalized monomer, Ti-HMPA;
 b) reacting 4,4-methylene bis(p-pheyl isocyanate) with poly(tetrahydrofuran) to form a diisocyanate terminated prepolymer, polymerizing; and
 b) reacting the Ti-HMPA functionalized monomer with the diisocyanate terminated prepolymer as a chain extender to produce the titania-polyurethane (nTiO$_2$-PU) nanocomposites.

A further understanding of the functional and advantageous aspects of the invention can be realized by reference to the following detailed description and drawings.

BRIEF DESCRIPTION OF THE DRAWINGS

Preferred embodiments of the invention will now be described, by way of example only, with reference to the drawings, in which:

FIG. 2 shows an FTIR Spectrum for optimized polyurethane elastomeric coating;

FIG. 3 shows SEM-EDX titanium mapping of composite surfaces: left is SEM Image, right is EDX Image (a) 5 wt % $TiO_2$—PU composite—monomer functionalization method (b) 5 wt % $tio_2$-pu composite—polymer functionalization method, scale bar is 10 μm;

DETAILED DESCRIPTION OF THE INVENTION

Figure 1:
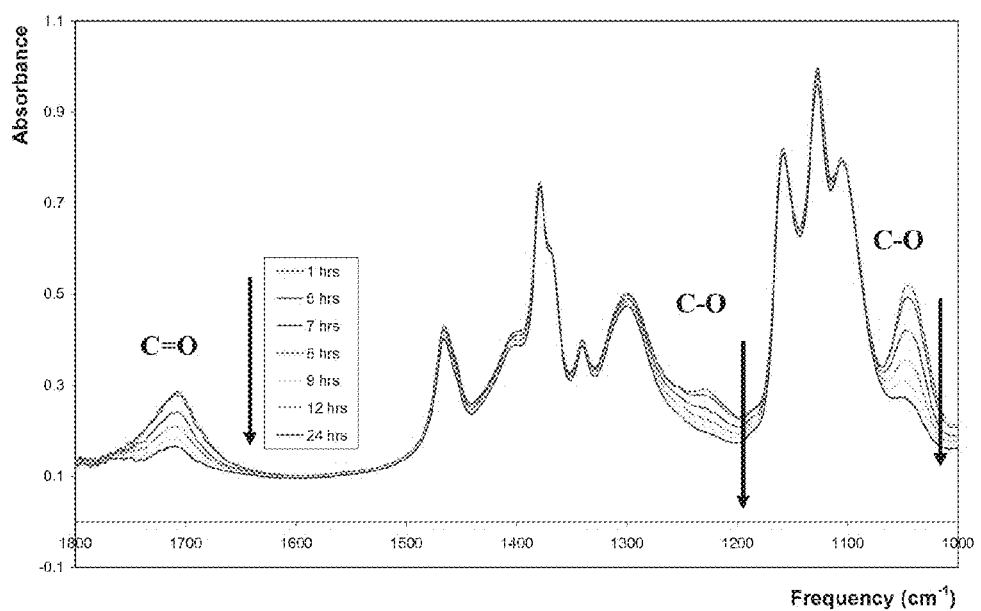
FIG. 1 shows in situ results for HMPA functionalization.

Generally speaking, the embodiments described herein are directed to nanotitania-polyurethane ($nTiO_2$-PU) nanocomposites as self-cleaning coatings. As required, embodiments of the present invention are disclosed herein. However, the disclosed embodiments are merely exemplary, and it should be understood that the invention may be embodied in many various and alternative forms.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, nanotitania-polyurethane ($nTiO_2$-PU) nanocomposites as self-cleaning coatings are disclosed herein.

As used herein, the terms "about", and "approximately" when used in conjunction with ranges of dimensions, concentrations, temperatures or other physical or chemical properties or characteristics is meant to cover slight variations that may exist in the upper and lower limits of the ranges of properties/characteristics.

The present invention provides methods for making self-cleaning coatings based on $TiO_2$ and polyurethanes (PUs). Polymer nanocomposite films were prepared using two methods including "grafting to" and "grafting from" strategies with nanotitania ($nTiO_2$) and polyurethanes (PUs), which are well known polymers used in outdoor applications with excellent mechanical and weathering properties [26].

In an embodiment of the invention a 50:50 anatase/rutile mixture of $nTiO_2$ was used to provide both UV protection to the PU polymer from the rutile phase, and photocatalytic activity from the anatase phase of $nTiO_2$ [26] [27]. For increasing dispersion and enhancing the mechanical properties of the polymer, the inclusion of $nTiO_2$ into a polymer matrix requires that the fillers be chemically bonded to the PU polymer, which requires functionalization. Functionalization may be achieved by coordinating a carboxylic acid group with $nTiO_2$ [28, 29]. Hence, in embodiments of this invention 2,2, bis(hydroxymethyl) propionic acid (HMPA) was utilized, which has both 2 hydroxyl groups for reacting with the diisocyanate terminated pre-polymer, and a carboxyl group for coordination to $nTiO_2$. The produced nanocomposites exhibit self-cleaning behavior as deduced based on studies using added HMPA or stearic acid as the model compounds for "dirt", then photoirradiated to be described hereinafter.

The present invention will now be illustrated using the following non-limiting example.

EXPERIMENTAL

Materials.

All chemicals were purchased from Sigma-Aldrich (Mississauga, ON). 4,4-methylene bis(p-pheyl isocyanate) (MDI) was purified using hot filtration of the melt with Whatman 50 filter papers at a temperature of 65° C. under vacuum. Poly (tetrahydrofuran) (PTHF) with an average molecular weight of 1000 Daltons was heated at 90° C. under vacuum to remove all moisture. 2,2-bis(hydroxymethyl)propionic acid (HMPA) was washed and filtered under vacuum with distilled reagent plus methanol, and recrystallized under vacuum at 70° C.

Titanium (IV) oxide nanopower ($nTiO_2$) with an average particle size of 25 nm at 99.9% purity (50:50 anatase:rutile), Toluene anhydrous, 99.8%, dimethylformamide (DMF) ACS reagent, ≥99.8%, and tetrahydrofuran (THF) anhydrous, ≥99.9%, inhibitor-free were all used as received.

Polyurethane Nanocomposite Synthesis.

Figure 9:
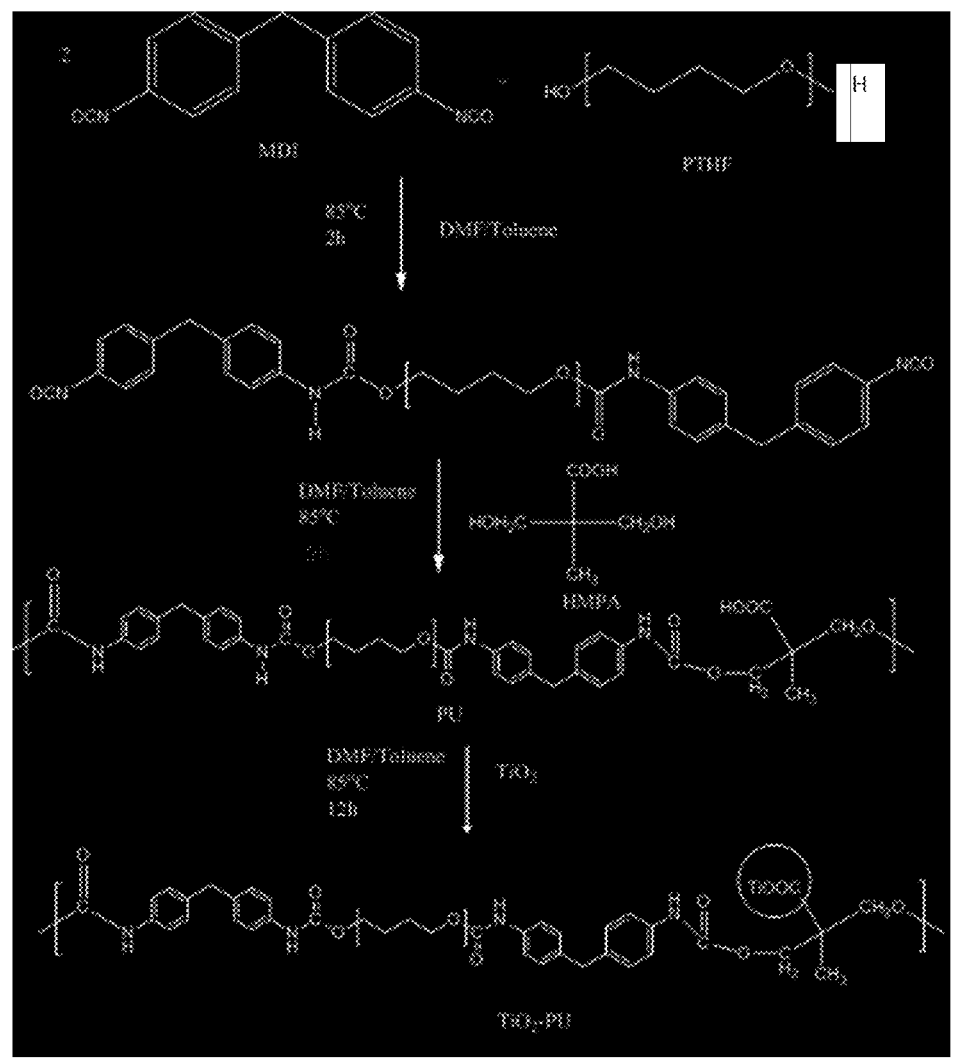
FIG. 9 shows Scheme 1 which shows the synthesis route for synthesiss of segmented polyurethana and nanocomposite synthesis using the polymer approach.

The polyurethane coatings were synthesized by a two-step process in DMF/toluene (50:50) at 85° C. under nitrogen as shown in Scheme 1 (FIG. 9). In the first step (prepolymerization), MDI was reacted with PTHF at a molar ratio of 2:1 for 2 hours to create the prepolymer. The prepolymer was then polymerized for 2 hours at a 1:1 molar ratio with the chain extender, HMPA, for the polymer or "grafting to" technique. The synthesized PU was then reacted with the $TiO_2$ nanoparticles at the desired wt. % for 12 hours in DMF/Toluene at 85° C. (Scheme 1).

Figure 10:
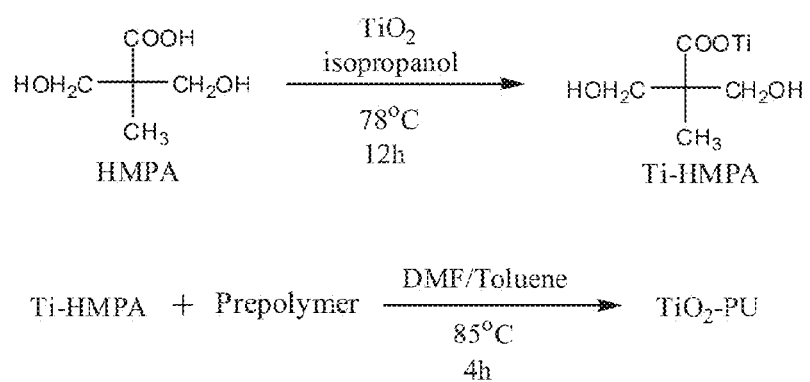
FIG. 10 shows Scheme 2 which shows the HMPA functionalization and subsequent nanocomposite synthesis using monomer approach.

For the monomer technique, 3.05 g of $nTiO_2$ was reacted with 5.0 g of HMPA in 100 mL of 2-propanol at 82° C. under constant agitation and nitrogen gas for 12 h to produce the functionalized monomer Ti-HMPA (Scheme 2, shown in FIG. 10). HMPA was originally a white powder which turned to a yellowish crystalline powder after reaction with $nTiO_2$. The Ti-HMPA functionalized monomer was then reacted with the diisocyanate terminated prepolymer as the chain extender using the procedure previously described. As $nTiO_2$ was relatively insoluble, an increased reaction time of 4 h was required. Using the polymer and monomer methods, $nTiO_2$-PU composites were formed for subsequent stearic acid and HMPA cleaning studies. The final polymers were purified by methanol washing and poured onto Teflon plates, then heating at 80° C. for 12 h under vacuum to form the nanocomposite films.

Characterization.

Fourier Transform Infrared (FTIR) spectroscopy using a Bruker® Vector 22 spectrometer with an MCT detector was operated using 32 scans at 4 $cm^{-1}$ resolution to identify the characteristic functional groups of the solid PU nanocomposite films, and the nanocomposites cleanability. To monitor the coordination of carboxylate groups to n-$TiO_2$, in situ FT-IR monitoring of the solution concentration was performed using an immersion probe (Sentinel-Mettler Toledo AutoChem) in a stirred 100-mL autoclave (Parr Instruments). The DiComp ATR probe consists of a diamond wafer, a gold seal, a ZnSe support/focusing element, housed in alloy C-276. The probe was attached to an FT-IR spectrometer (Mettler Toledo AutoChem ReactIR 4000) via a mirrored optical conduit, connected to a computer, supported by ReactIR 2.21 software (MTAC). Spectra were recorded at a resolution of 2 $cm^{-1}$ and the absorption spectra were the results of 64 scans.

TGA analysis was used for confirming the % $TiO_2$ in the nanocomposites and comparing their weight loss with temperature using a TA Instruments® Q-series TGA Q500 analyzer in the temperature range of 25-700° C. at a constant heating rate of 20° C./min under $N_2$ for sample sizes ranging from 5-10 mg. Scanning Electron Microscopy (SEM) images were recorded using a Hitachi® S-2600N instrument with each sample gold sputtered using a EMITCH® K550X deposited at 15 mA/min for 90 seconds to achieve a 5-7 nm gold layer. All samples were taken at 5 kV at varying magnifications for different views. For full scale views, the magnification was taken at 350× and for the close up images, the magnification was 2500× and 4000× for HMPA and Ti-HMPA respectively. STEM was performed using a Hitachi HD2000 at 200 kV. Random sections of the PU and nancomposite coatings were sampled with the presented images representative of the surface. Energy Dispersive X-ray (EDX) detection was used to determine the approximate fractions of $TiO_2$ on the surface of the PU composite coatings, and to measure the dispersion of n$TiO_2$ within each sample. EDX measurements were performed using a Quartz Xone EDX scattering device attached to the Hitachi® S-2600N Scanning Electron Microscope after each sample was gold sputtered using the aforementioned technique.

Hydrophilic and hydrophobic behavior of the polymer nanocomposites was evaluated by contact angle goniometry using a Ramé-Hart Model 100 goniometer equipped with a micro-syringe system under ambient conditions using the sessile-drop method. 1 µL water droplet was dropped on the surface of the PU nanocomposite films using a micro-injector from 1 cm from the surface. Assuming spherical geometry of the sessile drop, the static contact angle was estimated by manual measurements at the vapor-liquid-solid interface using a reading microscope. It was also assumed that the composite surface were highly smooth, uniform and homogeneous to where the solid surface does not interact with the probe liquid. The results were repeated a minimum of 3× with both the mean and standard deviations reported.

Examination of Self-Cleaning Behavior.

The self-cleaning photocatalytic properties of the PU and nanocomposite films were evaluated using both excess HMPA and stearic acid on the surface of the films under UV irradiation. The samples were dissolved in 50 mL of THF and 20% HMPA, then poured onto a Teflon plate and dried under vacuum at 65° C. for 24 hours. The samples were then irradiated perpendicular to the light source, at a constant distance of 10 cm with a 20 W black light bulb. The UV intensity irradiated to the sample surface was given to be 0.8 $mW/cm^2$ at the said distance using a 365±20 nm UV light source (model B100AP; UVP Inc.). During irradiation, air at room temperature was allowed to flow around the sample and the elimination of HMPA and stearic acid from the surface was determined using FTIR analysis. The sample thicknesses for all samples were between 90-110 µm controlled using a constant surface area Teflon plate for a constant mass of 1.0 g.

Results and Discussion

Monomer Functionalization Method

For the monomer method, HMPA was reacted with nano titanium dioxide (n$TiO_2$) to form a functionalized monomer, termed Ti-HMPA, as shown in Scheme 2. The reaction of HMPA with n$TiO_2$ to form the Ti-HMPA monomer was examined using in situ FTIR spectroscopy, as shown in FIG. 1. The characteristic peak at 1708 $cm^{-1}$ for the carbonyl group (C=O) stretch and the two C—O peaks at 1045 $cm^{-1}$ and 1225 $cm^{-1}$ in HMPA all decreased over a reaction time from 0-12 hours. This indicates that the functionalization reaction of HMPA removed the C=O and C—O groups, replacing them with coordination to n$TiO_2$. The small peak changes at 1410 $cm^{-1}$ and 1470 $cm^{-1}$ indicate some small changes in the titanium coordination peaks, further demonstrating functionalization. These results show that the coordination reaction took place in the first 12 hours, with no further reaction occurring in the remaining 12 hours.

Polyurethane Nanocomposite Synthesis

As illustrated in Schemes 1 and 2, n$TiO_2$/PU nanocomposites were synthesized using both the monomer ("grafting from") and polymer ("grafting to") techniques. The FTIR spectrums for the produced nanocomposite coatings showed all anticipated peaks[30] as shown in FIG. 2, e.g. the NH peak at 3350 $cm^{-1}$, the carbonyl peak at 1710 $cm^{-1}$ from the characteristic urethane linkage, and the lack of an isocyanate peak at 2265 $cm^{-1}$. The spectrum for the prepolymer was not measured because the —NCO end groups react once introduced to humid air to form an aldehyde end group. The % of $TiO_2$ incorporated into the nanocomposites was confirmed by TGA (not shown). Electron Microscopy of Nanocomposites In order to compare the "grafting from" and "grafting to" n$TiO_2$/PU samples, random sections of the coatings were sampled. FIG. 3 shows the SEM/EDX of the composite surfaces for (a) "grafting from" and (b) "grafting to" surfaces. Specifically, FIG. 3 shows the SEM-EDX titanium mapping of composite surfaces: Left is SEM Image, Right is EDX Image (a) 5 wt % $TiO_2$—PU composite—monomer functionalization method (b) 5 wt % $TiO_2$—PU composite—polymer functionalization method. The cale bar is 10 µm. The monomer "grafting from" technique gave much better dispersion of the nano titania particles in the PU matrix, and lowered $TiO_2$ agglomerate concentrations compared to the polymer "grafting to" method.

Figures 4A, 4B, 4C, 4D:
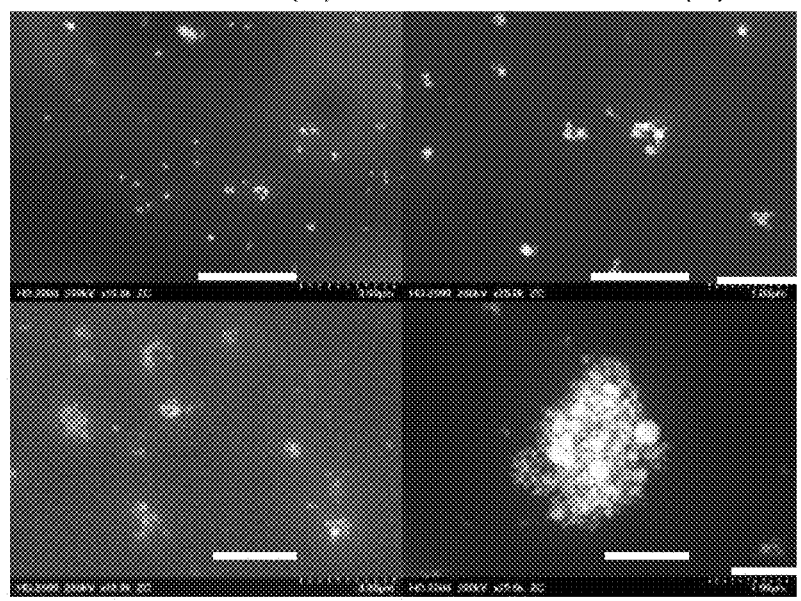
FIG. 4 shows STEM images of 5 wt % Ti-PU for (a) & (b) monomer functionalization method (3 μm and 1 μm scale, respectively) and (c) & (d) polymer functionalization method (3 μm and 1 μm scale, respectively)

In order to examine the dispersion of n$TiO_2$ throughout the surface of the PU composite coatings in more detail, STEM images of the nanocomposite samples were taken for both the monomer functionalized and polymer functionalized coatings, as shown in FIG. 4. $TiO_2$ nanoparticles incorporated into the polymer matrix appear both in the form of individual nanoparticles and small clusters of nano-sized agglomerates for the monomer functionalized n$TiO_2$-PU coating (FIG. 4a,b), whereas the polymer functionalized n$TiO_2$-PU coatings have $TiO_2$ in micron-sized agglomerates (FIG. 4c,d). Specifically, FIG. 4 shows STEM images of 5 wt % Ti-PU for (a) and (b) monomer functionalization method (3 µm and 1 µm scale, respectively) and (c) and (d) polymer functionalization method (3 μm and 1 μm scale, respectively). This result shows that the monomer method gave much better dispersion of nTiO$_2$ and less agglomeration than that using the polymer method, further supporting the SEM/EDX results.

Wettability Results

Table 1 compares the contact angles of the PU and nanocomposite samples from the sessile drop measurements using Cassie's equation:

$$\cos \theta_{app} = f_1 \cos \theta_1 + f_2 \cos \theta_2$$

where $\theta_{app}$ is the apparent contact angle, $f_1$ and $f_2$ are the apparent surface area fractions of TiO$_2$ and PU respectively, and $\theta_{app}$ is the average apparent contact angle. The contact angle for non-irradiated TiO$_2$ was assumed to be 30°. [1] The trend of Table 1 shows that the fraction of TiO$_2$ on the surface increases with increasing nTiO$_2$ content in the reaction mixture, and increases from the monomer synthesis (7.9%) to the polymer synthesis method (26.6%) for 5 wt % TiO$_2$.

TABLE 1

Contact Angles and calculations from Cassie's Equation for Polymer Nanocomposites.

| Sample | $\theta_{app\text{-}comp}$ | $f_{TiO2}$ | $f_{PU}$ |
|---|---|---|---|
| PU | 93.6 ± 1.82 | 0 | 1 |
| 5 wt % nTiO$_2$—PU monomer functionalization | 89.4 ± 3.91 | 0.079 | 0.921 |
| 5 wt % nTiO2—PU polymer functionalization | 79.4 ± 2.07 | 0.266 | 0.734 |
| 10 wt % nTiO$_2$—PU monomer functionalization | 76.6 ± 1.67 | 0.317 | 0.682 |
| 10 wt % nTiO$_2$—PU polymer functionalization | 72.6 ± 1.14 | 0.390 | 0.610 |

In the reaction of both the polymer and monomer methods of functionalization, equal mass percentages of TiO$_2$ were used and formed in the polymer as confirmed by TGA. However, both the 5 wt % and 10 wt % nTiO$_2$-PU samples using the polymer functionalization method gave a lower contact angle than that from the monomer technique, and a higher weight % of TiO$_2$ on the surface, which was similar to the EDX results, as also observed by electron microscopy. This is attributed to phase separation between the hydrophilic TiO$_2$ nanoparticles and the hydrophobic PU polymer [31]. The phase separation is reduced using the monomer method, which helps creates a more hydrophobic TiO$_2$ surface providing better dispersion in the polymer matrix and better linkage to the polymer chains.

TGA Analysis

Figure 5:
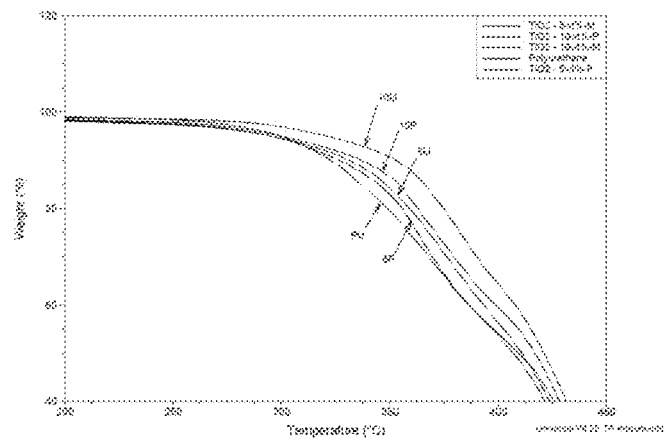
FIG. 5 shows comparative mass loss with respect to temperature for different concentrations and functionalization methods.

The effect of the two different methods of polymerization were studied using TGA analysis, as shown in FIG. 5 which shows comparative mass loss with respect to temperature for different concentrations and functionalization methods. At the crystalline hard segment decomposition temperature (over 275° C.), all nTiO$_2$-PU composite samples provided lower weight loss compared to the virgin PU sample, indicating enhanced stability of the nanocomposites with temperature. This Figure shows that increasing the mass percentage of n-TiO$_2$ in the polymer increases the thermal stability of the hard segment, thus increasing the thermal degradation temperature. This enhanced thermal behaviour is due to the ionic bonding between n-TiO$_2$ and the polymer chains, and ionic cross-linking formed through functionalization.

The TG curves show that the monomer method of functionalization "grafting from" improves the thermal stability to a greater extent at both 5 and 10 wt %, compared to the polymer method. This result is attributed to the increased dispersion of nTiO$_2$ throughout the PU and the enhanced linkage of the nanoparticles to the PU chains.

The polymer method does not break apart the nTiO$_2$ agglomerates as well, having larger groups of particles not functionalized within the matrix of the polymer. This can lead to phase separation between the polymer chains and the nTiO$_2$ particles, as shown by the contact angle results, decreasing the thermal properties[32]. Hence, as the monomer method decreases the size of the TiO$_2$ agglomerates and increases the amount of composite chain cross-linking; it provides better heat stability to the nanocomposite.

Cleanability Studies

Figure 6:
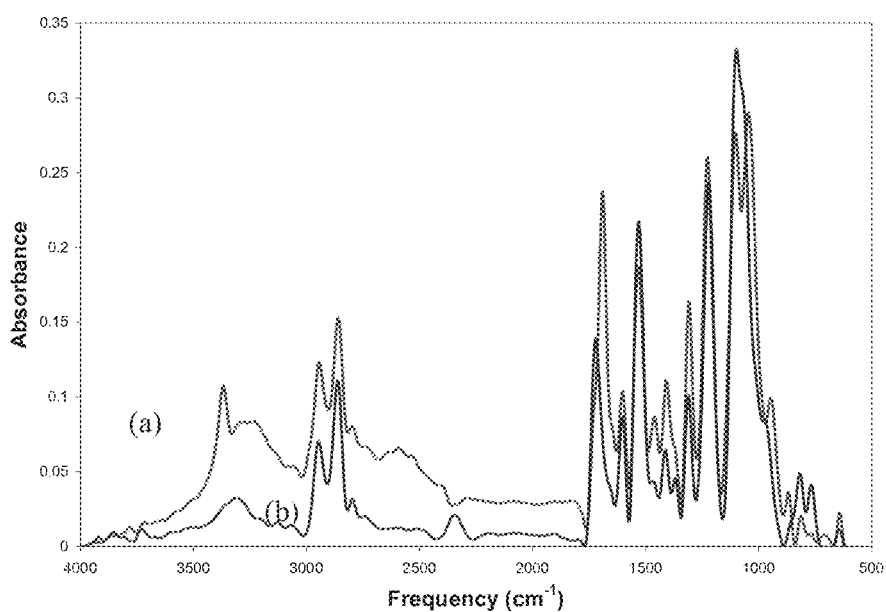
FIG. 6 shows cleanability of HMPA from PU-$TiO_2$ Nanocomposites: (a) Before Irradiation, and (b) After 24 hrs. Irradiation.

FTIR analysis was utilized to demonstrate the cleanability of each of these surfaces where two different substances as models for "dirt" were deposited on the surface of the polymer coatings, i.e. excess HMPA (Mw~134 g/mol), and stearic acid (Mw ~284 g/mol). FIG. 6 shows the cleanability of HMPA from PU-TiO$_2$ Nanocomposites: (a) Before Irradiation, and (b) After 24 hrs. Irradiation. FIG. 6 shows the individual spectra peaks of (a) the nTiO$_2$/PU composite with the excess HMPA mixed within the bulk of the polymer, and (b) the resulting surface spectra of the nTiO$_2$-PU composite after 24 hrs of irradiation. It is evident that the complete degradation of HMPA is seen by the disappearance of the OH peaks located between 3000-3600 cm$^{-1}$, the carboxylic acid OH peaks located between 2500-3000 cm$^{-1}$ and a decrease in the C=O peak at 1710 cm$^{-1}$; all three of which are the main characteristic peaks of HMPA. The FTIR analysis for the cleanability of the polymer and monomer functionalization methods with the addition of 20% excess HMPA were found to provide identical results with the surface being cleaned within 24 hours of irradiation with a UV source of 365 nm.

Figure 7:
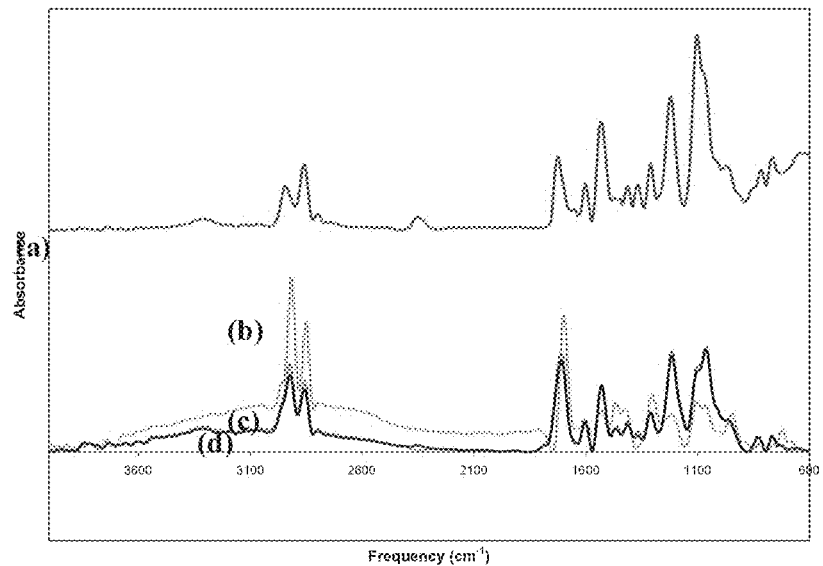
FIG. 7 shows FTIR cleanability results for 5 wt % $nTiO_2$-PU (Monomer method) contaminated with Stearic Acid (a) PU (b) $nTiO_2$-PU/Stearic Acid (0 min irradiation) (c) $nTiO_2$-PU/Stearic Acid (4000 min irradiation) (d) $nTiO_2$-PU/Stearic Acid (9000 min irradiation)

To further examine the cleaning differences between the two methods of functionalization, a larger more hydrophobic acid was used, i.e. stearic acid (Mw~284 g/mol), which is a common model for "dirt". FIG. 7 shows FTIR cleanability results for 5 wt % nTiO$_2$-PU (Monomer method) contaminated with Stearic Acid (a) PU (b) nTiO$_2$-PU/Stearic Acid (0 min irradiation) (c) nTiO$_2$—PU/Stearic Acid (4000 min irradiation) (d) nTiO$_2$-PU/Stearic Acid (9000 min irradiation). FIG. 7 shows the photocatalytic cleanability of stearic acid on the surface of nTiO$_2$-PU composite coatings over a time frame of 0-9000 minutes produced by the monomer functionalization method. Stearic acid contains typical peaks for C=O stretch (~1700 cm$^{-1}$), O—H stretch (~2500-3000 cm$^{-1}$ for a carboxylic acid), and C—H stretches (2800-3000 cm$^{-1}$).

It can be seen that the degradation of stearic acid occurs after UV irradiation by the lowering of these peaks from 0-9000 minutes. Most of the cleaning occurs in the first 4000 minutes, with 9000 minutes providing essentially complete cleaning of stearic acid. Stearic acid takes considerably more time to be "cleaned" than HMPA, likely as HMPA is both a lower Mw material and more highly oxidized, hence making it easier to be degraded.

Figure 8:
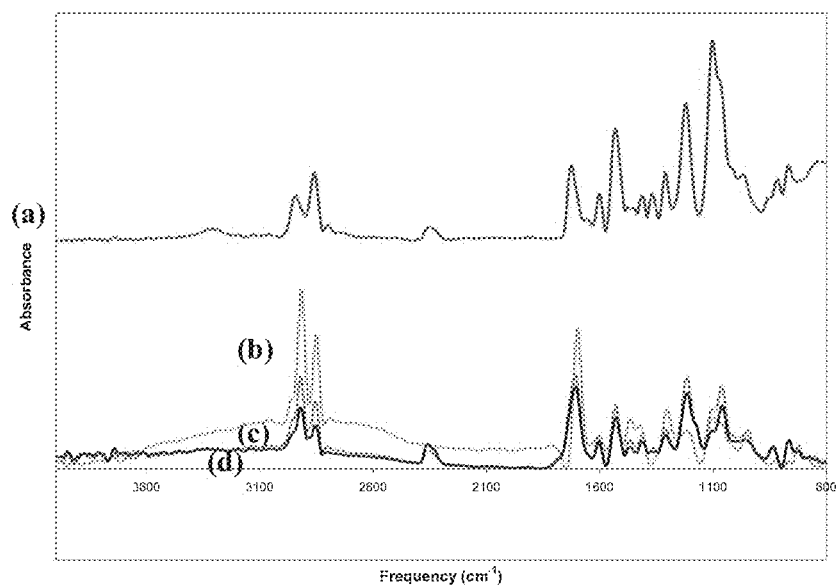
FIG. 8 shows FTIR cleanability results for 5 wt % $nTiO_2$-PU (Polymer method) contaminated with Stearic Acid (a) PU (b) $nTiO_2$-PU/Stearic Acid (0 min irradiation) (c) $nTiO_2$-PU/Stearic Acid (4000 min irradiation) (d) $nTiO_2$-PU/Stearic Acid (9000 min irradiation)

The polymer method (FIG. 8) shows essentially identical cleaning results of stearic acid. However, it led to an additional small decreasing of the C—H stretch peaks at 2800 cm$^{-1}$ at 9000 minutes of UV irradiation, indicating possible degradation of the polymer substrate. By optimizing the anatase/rutile ratio for different polymers, the degradation of the polymer surface can be minimized.

As shown above, the present compositions may be formulated to be applied to a substrate surface as a self-cleaning coating. They may also be formulated as a foam using aromatic diisocyanates (e.g. toluene diisocyanate (TDI) or diphenylmethane diisocyanate (MDI or polymeric MDI) In this application, the foams are sprayed onto surfaces using commercial spraying devices consisting of liquid MDIs and polyols (along with appropriate chain extenders, cross linkers, and surfactants) that are pumped from separate vessels, then mixed together in a spraying head and delivered through a heated nozzle onto a desired surface. The Ti-HMPA additive can be blended into the polyol tank, with the spraying ratios adjusted accordingly. Rigid pour in place and molded foams can similarly be produced using the aromatic diisocyanate and mixed with the polyol/Ti-HMPA mixture using common industrial procedures.

The compositions may also be formulated as an elastomer using aromatic diisocyanates. Usually elastomeric polyurethane materials have a higher solids content than the foam based ones, although they are of similar composition. As described in the above application, flexible elastomeric materials are commonly produced by spraying a liquid TDI or MDI with polyol that are joined in a mixing chamber of a spraying device and subsequently deposited onto a surface after exiting through a heated nozzle. Here the Ti-HMPA can be blended with the polyol/additive mixture and dispensed in the appropriate ratio (monomer approach).

The present compositions may be formulated as a paint or topcoat finish using aliphatic diisocyanates with nanotitania for the paint additive and subsequently sprayed, brushed or rolled. Common aliphatic diisocyantes include hexamethylene diisocyanate (HDI), isophorone diisocyanate (IPDI), and H12-MDI which can be used for this purpose. The common two package approach can be used where the aliphatic polyisocyanate is mixed immediately prior to application with polyacrylate polyol resin containing material. The Ti-HMPA mixture can be added into the polyol package (monomer approach) or pre-polymer (polymer approach) with reactive chain ends. The Ti-HMPA can also be blended into a solvent based polyurethane paint application.

The compositions may be substantially optically transparent using aliphatic diisocyanates. Common aliphatic diisocyantes include hexamethylene diisocyanate (HDI), isophorone diisocyanate (IPDI), and H12-MDI. Here the diisocyanates can be mixed with polols and either sprayed, brushed or rolled. The compositions may be applied to any substrate including, but not limited polymers, textiles, ceramic, cement, glass, metal, wood, paper, nanoparticles and nanofibres.

The composition properties can be adjusted to be either hydrophilic or hydrophobic depending on polymer and nanostructure composition. Increased hydrophobicity can be obtained by increasing the polyol chain length while increased hydrophilicity can be obtained by increasing the amount of Ti-HMPA additive.

The compositions may be formulated to exhibit antimicrobial properties as nano-titania is a well known photocatalyst that can produce superoxide radicals when exposed to sunlight that break down cell walls of bacteria, fungi, while disrupting viruses and other microbial agents.

The compositions may be substantially non-degradable to the polyurethane polymer by optimizing the ratio of rutile: anatase $TiO_2$.

SUMMARY

Polymer nanocomposites, $nTiO_2$-PU, were prepared using both a monomer polymerization method 'grafting from' and a polymer polymerization method 'grafting to'. For the monomer method $nTiO_2$ was shown to react with HMPA to form $nTiO_2$—HMPA crystals, where the $nTiO_2$ were well dispersed. The functionalization via the monomer method was found to aid in the breaking up of the $TiO_2$ agglomerates, giving better dispersion than the polymer functionalization method. EDX and contact angle analysis showed that the monomer method gave a lower amount of $TiO_2$ on the surface, and more hydrophobic polymers. The TGA analysis showed that both polymerization techniques gave nanocomposites with better heat stability than the virgin PU although the monomer technique gave more heat stable nanocomposites compared to the polymer technique. Both techniques showed similar self-cleaning behavior when excess HMPA or stearic acid were added as models for dirt, with the monomer method showing less substrate degradation.

A self-cleaning composition for application to surfaces, comprising titania-polyurethane ($nTiO_2$-PU) nanocomposites has been disclosed, however it will be appreciated that the present invention is not restricted to this particular embodiment. For example, other step-growth polymers containing an HO—R(COOH)—OH type functionality can also be made self-cleaning using this approach containing a di, tri, or tetra alcohol, such as, but not limited to, polyesters, polycarbonates, polybenzoxazoles, and polysulfones.

Both titania and doped titania nanoparticles (doped using transition metals e.g. Fe, Cr, V, N, Co, or anions, e.g. Nitrogen, S, F, etc.) or Zinc Oxide may be used. As well encapsulating the $TiO_2$ with $SiO_2$ can be beneficial for photocatalysis. Anatase:Rutile ratios can be altered from about 10:90 to about 90:10. The $nTiO_2$ may have an average particle size of in a range from about 1 to about 500 nm of about 50:50 anatase:rutile.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

[1] Mills, A, Lepre, A, Elliott, N, Bhopal, S, Parkin, I P & O'Neill, S A. Journal of Photochemistry and Photobiology a-Chemistry 2003; 160(3):213.
[2] Parkin, I P & Palgrave, R G. Journal of Materials Chemistry 2005; 15(17):1689.
[3] Kemmitt, T, Al-Salim, N I, Waterland, M, Kennedy, V J & Markwitz, A. Current Applied Physics 2004; 4(2-4):189.
[4] Fujishima, A & Honda, K. Nature 1972; 238:37.
[5] Zhao, J & Yang, X D. Building and Environment 2003; 38(5):645.
[6] Zhang, L, Kanki, T, Sano, N & Toyoda, A. Separation and Purification Technology 2003; 31:105.
[7] Chin, P & 011 is, D F. Catal. Today 2007; 123(1-4):177.
[8] Ramires, P A, Giuffrida, A & Milella, E. Biomaterials 2002; 23(2):397.
[9] Yoshida, K, Taira, Y & Atsuta, M. J Dent Res 2001; 80(3):864.

[10] Croce, F, Appetecchi, G B, Persi, L & Scrosati, B. Nature 1998; 394:456.
[11] Ahn, J-H, Wang, G X, Liu, H K & Dou, S X. J Power Sources 2003; 119-121:422.
[12] Petrella, A, Tamborra, M, Curri, M L, Cosma, P, Striccoli, M, Cozzoli, P D & Agostiano, A. J Phys Chem B 2005; 109(4):1554.
[13] Kocher, M, Daubler, T K, Harth, E, Scherf, U, Gugel, A & Neher, D. Appl Phys Lett 1998; 72(6):650.
[14] Zan, L, Tian, L, Liu, Z & Peng, Z. Appl Cat A 2004; 264(2):237.
[15] Jordan, J, Jacob, K I, Tannenbaum, R, Sharaf, M A & Jasiuk, I. Mater. Sci. Eng., A 2005; A393(1-2):1.
[16] Schaefer, D W & Justice, R S. Macromolecules 2007; 40(24):8501.
[17] Zan, L, Tian, L H, Liu, Z S & Peng, Z H. Applied Catalysis a-General 2004; 264(2):237.
[18] Kim, S H, Kwak, S Y & Suzuki, T. Polymer 2006; 47(9):3005.
[19] Xia, H & Wang, Q. Chem. Mater. 2002; 14(5):2158.
[20] Wang, Q, Xia, H & Zhang, C. J Appl Poym Sci 2001; 80(9):1478.
[21] H Xia & Wang, Q. Applied Polymer Science 2003; 87(11):1811.
[22] Jin K & Rudolf Faust, 40:10, 991-1008. Journal of Macromolecular Science, Part A 2003; 40(10):991.
[23] Zajac R & Chakrabarti A I. Phys. Rev. E. 1995; 52(6-B):6536-6549.
[24] Li C, Benicewicz B C &. Macromolecules 2005; 38(14):5929.
[25] Lott, J R. Journal 2006; (Issue):1.
[26] Chen, X D, Wang, Z, Liao, Z F, Mai, Y L & Zhang, M Q. Polymer Testing 2007; 26(2):202.
[27] Li, G, Ciston, S, Saponjic, Z V, Chen, L, Dimitrijevic, N M, Rajh, T & Gray, K A. Journal of Catalysis 2008; 253 (1):105.
[28] Hojjati, B, Sui, R H & Charpentier, P A. Polymer 2007; 48(20):5850.
[29] Khaled, S M, Sui, R, Charpentier, P A & Rizkalla, A S. Langmuir 2007; 23(7):3988.
[30] Yu, X, Nagarajan, M R, Li, C, Gibson, P E & Cooper, S L. Journal of Polymer Science Part B: Polymer Physics 1986; 24:2681.
[31] Vafaei, S, Borca-Tasciuc, T, Podowski, M Z, Purkayastha, A, Ramanath, G & Ajayan, P M. Nanotechnology 2006; 17(10):2523.
[32] Szycher, M, Szycher's handbook of polyurethanes, CRC Press, Boca Raton, 1999.

Therefore what is claimed is:

1. A composition comprising nanotitania-polyurethane (nTiO$_2$-PU) nanocomposites in which nTiO$_2$ nanoparticles are coordinated directly to a polyurethane backbone, wherein the composition is self-cleaning, and produced by a method comprising the steps of:
   a) reacting 4,4-methylene bis(p-phenyl isocyanate) with poly(tetrahydrofuran) to form a prepolymer, polymerizing the prepolymer in the presence of a chain extender 2,2-bis(hydroxymethyl)propionic acid to form polyurethane; and
   b) reacting the polyurethane with TiO$_2$ nanoparticles to produce the titania-polyurethane (nTiO$_2$-PU) nanocomposites.

2. The composition prepared according to the method of claim 1 wherein in step a) the 4,4-methylene bis(p-phenyl isocyanate) is reacted with the poly(tetrahydrofuran) at a molar ratio of about 2:1 for about 2 hours to produce the prepolymer; and wherein the prepolymer is polymerized for about 2 hours at about a 1:1 molar ratio with the chain extender 2,2-bis(hydroxymethyl)propionic acid.

3. The composition prepared according to the method of claim 1 wherein in step b) the synthesized polyurethane is reacted with the TiO$_2$ nanoparticles for about 12 hours in dimethylformamide/toluene at about 85° C.

4. The composition prepared according to the method of claim 1 wherein in step b) said nTiO$_2$ includes titanium (IV) oxide nanoparticles (nTiO$_2$) having a composition with anatase:rutile ratio in a range from about 10:90 to about 90:10.

5. The composition prepared according to the method of claim 4 wherein said anatase:rutile ratio is 50:50.

6. The composition prepared according to the method of claim 1 wherein in step b) wherein said nTiO$_2$ nanoparticles have an average particle size of in a range from about 1 nm to about 500 nm.

7. The composition prepared according to the method of claim 1 wherein in step b) wherein said nTiO$_2$ nanoparticles have an average particle size of about 25 nm.

8. The composition prepared according to the method of claim 1 wherein in step b) wherein said nTiO$_2$ nanoparticles are doped with one of transition metals, anions, zinc oxide, and any combination thereof.

9. The composition prepared according to the method of claim 8 wherein said transition metals are selected from the group consisting of Fe, Cr, V, N, Co, and wherein said anions are selected from the group consisting of nitrogen, sulphur and fluorine anions.

10. A composition comprising nanotitania-polyurethane (nTiO$_2$-PU) nanocomposites in which nTiO$_2$ nanoparticles are coordinated directly to a polyurethane backbone, wherein the composition is self-cleaning, and produced by a scheme as follows:

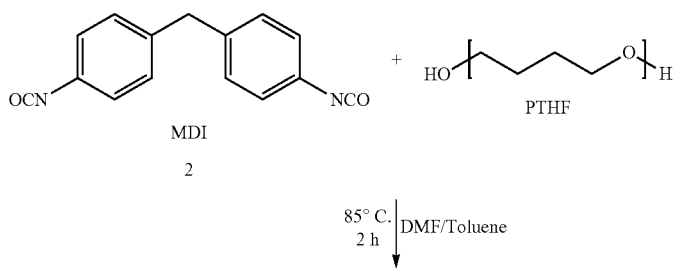

-continued

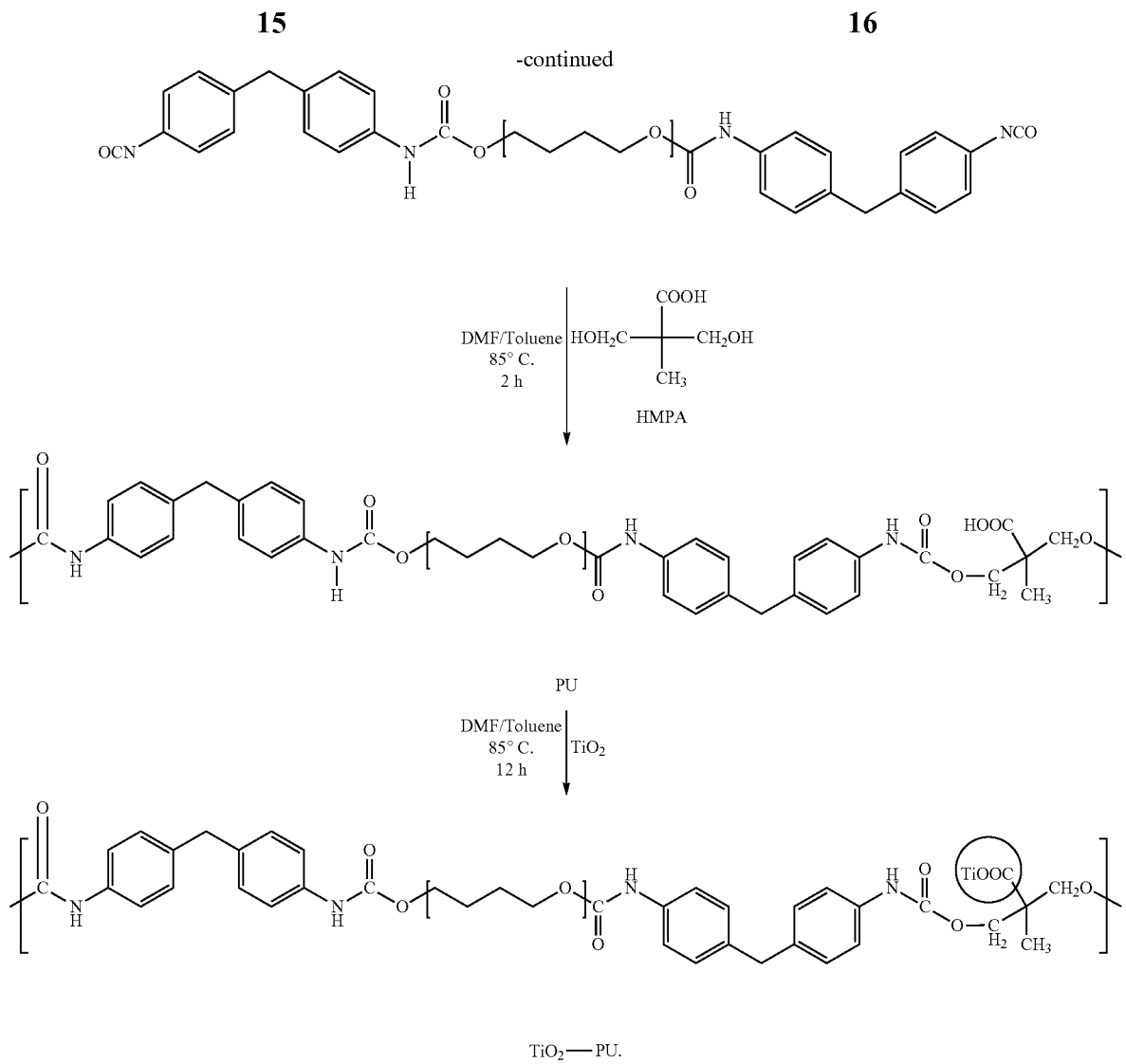

PU

TiO₂—PU.

11. A composition comprising nanotitania-polyurethane (nTiO₂-PU) nanocomposites in which nTiO₂ nanoparticles are coordinated directly to a polyurethane backbone, wherein the composition is self-cleaning, and produced by a method comprising the steps of:
  a) reacting nTiO₂ with 2,2-bis(hydroxymethyl)propionic acid (HMPA) to produce a functionalized monomer, Ti-HMPA;
  b) reacting 4,4-methylene bis(p-phenyl isocyanate) with poly(tetrahydrofuran) to form a diisocyanate terminated prepolymer; and
  c) reacting the Ti-HMPA functionalized monomer with the diisocyanate terminated prepolymer as a chain extender to produce the titania-polyurethane (nTiO₂-PU) nanocomposites.

12. The composition prepared according to the method of claim 11 wherein in step a) the nTiO₂ is reacted with the 2,2-bis(hydroxymethyl)propionic acid in 2-propanol at about 82° C. under constant agitation and nitrogen gas for about 12 h to produce the functionalized monomer Ti-HMPA.

13. The composition according to claim 11 produced by a scheme as follows:

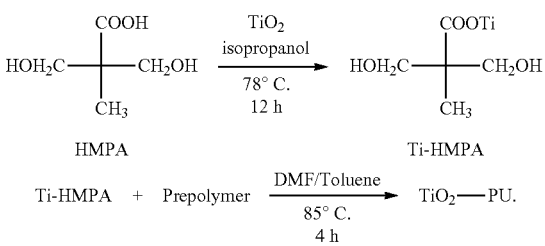

14. The composition prepared according to the method of claim 11 wherein in step a) said nTiO₂ includes titanium (IV) oxide nanoparticles (nTiO₂) having a composition with anatase:rutile ratio in a range from about 10:90 to about 90:10.

15. The composition prepared according to the method of claim 14 wherein said anatase:rutile ratio is 50:50.

16. The composition prepared according to the method of claim 11 wherein in step a) wherein said nTiO₂ has an average particle size of in a range from about 1 nm to about 500 nm.

17. The composition prepared according to the method of claim 11 wherein in step a) wherein said nTiO₂ has an average particle size of about 25 nm.

18. The composition prepared according to the method of claim 11 wherein in step a) wherein said nTiO$_2$ is doped with one of transition metals, anions, zinc oxide, and any combination thereof.

19. The composition prepared according to the method of claim 18 wherein said transition metals are selected from the group consisting of Fe, Cr, V, N, Co, and wherein said anions are selected from the group consisting of nitrogen, sulphur and fluorine anions.

* * * * *